Oct. 8, 1940.    I. WOLARSKY    2,217,533
SUSPENSION FOR LIGHTING FIXTURES
Filed June 15, 1937
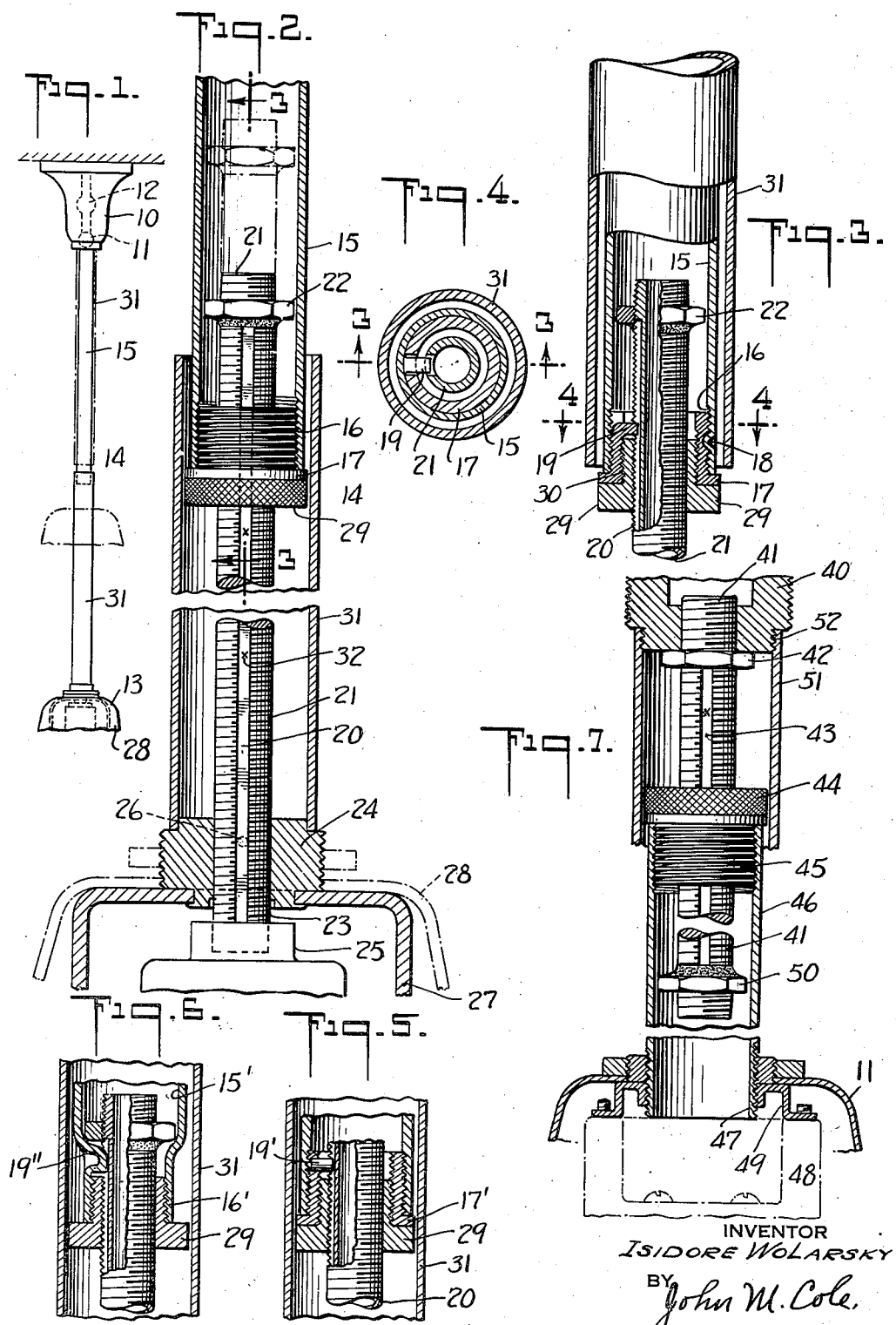
INVENTOR
ISIDORE WOLARSKY
BY John M. Cole.
ATTORNEY Patented Oct. 8, 1940

2,217,533

UNITED STATES PATENT OFFICE 2,217,533

SUSPENSION FOR LIGHTING FIXTURES

Isidore Wolarsky, Mount Vernon, N. Y.

Application June 15, 1937, Serial No. 148,262

7 Claims. (Cl. 248—333)

The present invention relates to suspensions for lighting fixtures, and is more particularly directed toward adjustable suspension, whereby the mounting height of the fixtures may be adjusted.

The present invention contemplates a form of adjustable suspension which is readily usable with various forms and styles of suspended lighting fixtures, such as occur in school, industrial and office lighting. In this field there is no standard length of support or suspension for the fixture. These lengths depend upon ceiling height and other factors which must be taken into account, so that it is difficult for manufacturers to provide their jobbers and dealers with a stock of fixtures which can be readily adapted for mounting in various locations, especially where stem type suspensions are demanded.

According to the present invention it is not necessary to resort to chain suspension to provide a readily adjustable suspension for the fixture, and it is possible for the dealer or jobber to have a stock of suspensions on hand which will fit practically any situation which may arise.

According to the present invention the suspension contemplates the employment of two tubular telescoping members, one secured to the fixture supported at the ceiling, and the other to the fixture body, and that one of these members should be provided with suitable means for adjustably connecting it with the other in such a way that the overall length of the suspension may be adjusted and preferably so that there will be no turning or twisting of the parts, whereby twisting of fixture wires is avoided.

The accompanying drawing shows, for purposes of illustrating the present invention, several embodiments in which the invention may take form, it being understood that the drawing is illustrative of the invention rather than limiting the same.

In the accompanying drawing,

Figure 1 is a diagrammatic elevational view illustrating a lighting fixture suspension;

Figure 2 is a vertical sectional view through the same with parts in elevation;

Figure 3 is a vertical sectional view with parts in slightly different position than in Figure 2 and taken on the line 3—3 of Figure 4;

Figure 4 is a transverse sectional view on the line 4—4 of Figure 3;

Figures 5 and 6 are fragmentary elevated sectional views illustrating modified forms of construction; and Figure 7 is a view similar to Figure 2, showing the suspension with certain parts inverted from the position assumed in Figure 2.

In the drawing a conventional fixture canopy is illustrated at 10. It encloses the usual swivel 11 and hook 12. The upper part of a fixture body is illustrated at 13 and an interconnecting suspension at 14. The upper member of this suspension is indicated at 15, and it is secured in any convenient manner to the swivel 11, as is customary in fixture construction. The lower end of this tubular member 15 is threaded, as indicated at 16, to receive a bushing 17.

This bushing is preferably locked in place by an indentation, indicated at 18. The bushing has a key like member 19, which extends into a keyway 20 formed in the side wall of a tubular stem 21. This stem is provided with running threads extending its entire length, as indicated, and at the upper end the stem carries an abutment in the form of a nut 22, which prevents removal of the stem downwardly. This stem is adapted to telescope inside the tubular member 15, and at its lower end is fixedly connected to the fixture body.

In the form here shown the lower end 23 of this stem is threaded into a ring 24, and is secured to the cap 25 of a lamp socket. The ring 24 is locked against rotation by a pin, indicated in dotted lines at 26. The ring 24 supports a bail or yoke 27 adapted to support the glassware of the fixture, and a socket cover, indicated at 28, covers the parts.

Owing to the fact that the socket 25 is securely attached to the lower end of the tube 21 and to the secure attachment customarily employed between fixture stems and canopies it is possible to secure an adjustment of the fixture body relative to the socket by merely turning the fixture body and nut 24 on the tube 21 to raise the fixture body relative to the socket. In this way the glassware can be adjusted relative to the socket after the wiring has been completed and without disturbing the wiring in any way.

The threaded stem 21 carries a nut 29, which can be adjusted along the stem, and this nut is threaded at 30, as indicated in Figure 3, so as to thread into the threads carried in the bushing 17. An external covering sheath 31 is provided to conceal the threads on the stem 21 and nut, and this sheath assumes the position shown in Figure 2 when the fixture is hanging. It can be elevated up to the dot-and-dash line position of Figure 1, or to the full line position of Figure 3 to afford access to the nut for effecting adjustment of the overall length of the suspension.

The bottom of the keyway 20 may be provided with punch marks or other indications, such as "x's" indicated at 32, so as to indicate to the electrician the adjustment which is being effected. This makes it possible to readily adjust a number of fixture stems to a uniform length without measuring them.

In the arrangement shown in Figure 5, the bushing 17' is provided with a pin 19' instead of a bent over portion, as indicated in Figure 3. The parts are otherwise the same.

In the arrangement shown in Figure 6, the lower end of the tubular member 15' is reduced in diameter, as shown at 16', and internally threaded so as to co-operate with the the nut 29. The key like member 19" is provided by striking in a portion of the tube 15'.

In the arrangement shown in Figure 7, the suspension for the fixture is secured to an element, indicated at 40. This may be of any desired form of construction. It is here shown as internally threaded to support the upper end of the tubular stem 41, and this is locked in place by a lock nut, indicated at 42. This tubular stem is provided with running threads its entire length, as shown, and with a keyway indicated at 43. The stem 41 carries a nut 44, similar to the nut 29, and adapted to be threaded into a bushing 45, as shown in Figure 3. This bushing 45 is threaded into a tubular member 46, the lower end 47 of which is secured to the socket 48 in any convenient manner, for example, by the member 49. A stop member 50 carried by the stem 41 prevents accidental separation of the parts. The external cover sheath is shown at 51, and it is suitably secured to the support 40, for example, by the threads indicated at 52.

From the foregoing it will be apparent that a very convenient form of adjustable suspension for lighting fixtures has been provided. It consists of inexpensive screw machine made parts which can be very easily assembled. The concealed parts can be made out of inexpensive materials, so that the cost of the suspension is moderate. It is only necessary to make up suspensions in two sizes to be able to adapt the suspension for practically the entire range of suspension lengths employed in commercial lighting fixtures. For example, one suspension may be adjustable between the lengths of 18 and 34 inches, and another one adjustable between the lengths of 36 and 70 inches.

It is obvious that the invention may be embodied in many forms and constructions within the scope of the claims and I wish it to be understood that the particular forms shown are but a few of the many forms. Various modifications and changes being possible, I do not otherwise limit myself in any way with respect thereto.

What is claimed is:

1. A device for suspending the body of an electric lighting fixture from a ceiling support comprising two telescoping tubular members one secured at its upper end to the support so as to hang down from the support for its entire length, the other member being substantially the same length as the first and secured at its lower end to the fixture body so that wiring may be carried from the ceiling support to the fixture body, the smaller diameter member being provided with a running thread and a keyway both extending from said secured end thereof nearly to the other end, a nut threaded on said smaller diameter member, the larger diameter tubular member carrying a projection which enters the keyway whereby the tubular members are non-rotatably connected together for sliding movement so that their overall length may be adjusted from substantially the length of one tubular element to substantially twice that length, the nut being adjustable along the smaller diameter member so as to be opposite the free end of the larger diameter member at any length to which the suspension device may be extended, and means for disconnectably coupling the nut and free end of the larger diameter member.

2. A device such as claimed in claim 1, wherein the projection is carried on a bushing secured in the outer tubular member, and the bushing and nut have co-operable threads.

3. A device such as claimed in claim 1, wherein the free end of the threaded member has a stop which engages the projection and prevents the withdrawal of said member from the outer member so that the fixture body may be supported when the nut is disconnected from the tubular member.

4. A device such as claimed in claim 1, having an outer sleeve slidable on the outer tubular member and of a length to conceal the threaded member, the nut and adjacent end of the said outer tubular member at any length to which the suspension device may be extended, and to be moved to provide access to the nut.

5. A device such as claimed in claim 1, wherein the large diameter member is indented to form the key and has a threaded end to cooperate with threads on the nut.

6. A device such as claimed in claim 1, wherein the large diameter member is secured at its upper end to the ceiling support and the lower end of the threaded member is secured to the fixture body.

7. A device for suspending the socket and globe support of an electric lighting fixture from a ceiling support comprising two telescoping tubular members, the larger diameter member being secured at its upper end to the support so as to hang down from the support for its entire length, the other member being substantially the same length as the first and provided with a running thread and a keyway both extending from adjacent the upper end to the lower end thereof, the said lower end being independently threadedly secured to the socket and globe support so that wiring may be carried from the ceiling support to the socket, a nut threaded on said smaller diameter member above the globe support, the upper tubular member carrying a projection which enters the keyway whereby the tubular members are non-rotatably connected together for sliding movement so that their overall length may be adjusted from substantially the length of one tubular element to substantially twice that length, the nut being adjustable along the smaller diameter member so as to be opposite the free end of the larger diameter member at any length to which the suspension device may be extended, and means for disconnectably coupling the nut and free end of the larger diameter member.

ISIDORE WOLARSKY.